(12) United States Patent
Kim et al.

(10) Patent No.: US 9,449,085 B2
(45) Date of Patent: Sep. 20, 2016

(54) PATTERN MATCHING OF SOUND DATA USING HASHING

(71) Applicant: Adobe Systems Incorporated, San Jose, CA (US)

(72) Inventors: Minje Kim, Savoy, IL (US); Paris Smaragdis, Urbana, IL (US); Gautham J. Mysore, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 236 days.

(21) Appl. No.: 14/080,173

(22) Filed: Nov. 14, 2013

(65) Prior Publication Data

US 2015/0134691 A1     May 14, 2015

(51) Int. Cl.
     *G06F 7/00*         (2006.01)
     *G06F 17/30*       (2006.01)

(52) U.S. Cl.
CPC ... *G06F 17/30778* (2013.01); *G06F 17/30026* (2013.01); *G06F 17/30743* (2013.01); *G06F 17/30755* (2013.01); *G06F 17/30758* (2013.01)

(58) Field of Classification Search
None
See application file for complete search history.

(56) References Cited

U.S. PATENT DOCUMENTS

| | | | | |
|---|---|---|---|---|
| 4,087,630 A * | 5/1978 | Browning | | G10L 15/00 704/236 |
| 6,671,404 B1 * | 12/2003 | Kawatani | | G06K 9/6279 382/190 |
| 8,977,374 B1 * | 3/2015 | Eck | | G10L 25/63 700/94 |
| 2009/0132245 A1 * | 5/2009 | Wilson | | G10L 21/0272 704/226 |
| 2011/0173208 A1 * | 7/2011 | Vogel | | G10L 25/48 707/746 |
| 2013/0254191 A1 * | 9/2013 | He | | G06F 17/3053 707/728 |

OTHER PUBLICATIONS

Zhouyu Fu et al, "A Survey of Audio-Based Music Classification and Annotation", IEEE 2010, 17 pages.*
Chen et al, "Audio hash function based on non-negative matrix factorization of mel-frequency cepstral coefficients", EIT Information Security, 2011 vol. 5, Iss.1, pp. 19-25.*
Deng et al, "Audio Fingerprinting Based on Spectral Energy Structure and NMF", IEEE 2011, 7 pages.*
Dean, et al., "Fast, Accurate Detection of 100,000 Object Classes on a Single Machine", IEEE Conference on Computer Vision and Pattern Recognition (CVPR), 2013, 8 pages.
"Locality-Sensitive Hashing", Wikipedia, retrieved from <http://en.wikipedia.org/wiki/Locality_sensitive_hashing> on Nov. 13, 2013, 5 pages.

* cited by examiner

*Primary Examiner* — Uyen Le
(74) *Attorney, Agent, or Firm* — Wolfe-SBMC

(57) ABSTRACT

Pattern matching of sound data using hashing is described. In one or more implementations, a query formed from one or more spectrograms of sound data is hashed and used to locate one or more labels in a database of sound signals. Each of the labels is located using a hash of an entry in the database. At least one of the located one or more labels is chosen as corresponding to the query.

20 Claims, 8 Drawing Sheets

| Precision | Recall | F-Measure | Accuracy | N-Bits |
|---|---|---|---|---|
| 0.7043 | 0.5819 | 0.6346 | 0.9560 | 8 |
| 0.9476 | 0.7633 | 0.8404 | 0.9812 | 4 |
| 0.9682 | 0.8342 | 0.8922 | 0.9870 | 2 | ns
PATTERN MATCHING OF SOUND DATA USING HASHING

BACKGROUND

Pattern matching of sound data may be utilized to support a wide variety of different usage scenarios. For example, pattern matching may be utilized to support audio source separation, which may involve identification of sound data that corresponds to different sound sources. This may be performed to remove noise from a recording, separate different speakers in a dialog, and so on. In another example, pattern matching may be used to support word spotting and audio retrieval. This may be performed to support voice recognition as part of an automated system (e.g., a virtual phone menu) by identifying particular keywords in the sound data, locate sound data having desired keywords or other sounds, and so on.

However, conventional techniques that were utilized to support pattern matching could be resource intensive. Accordingly, these conventional techniques could be challenged in support of real time scenarios, such as when employed by an interactive system and thus may limit the usefulness of these conventional techniques.

SUMMARY

Pattern matching of sound data using hashing is described. In one or more implementations, a query formed from one or more spectrograms of sound data is hashed and used to locate one or more labels in a database of sound signals. Each of the labels is located using a hash of an entry in the database. At least one of the located one or more labels is chosen as corresponding to the query.

In one or more implementations, dictionaries of specific sources of sound data are trained using hashing as a part of nonnegative matrix factorization (NMF). The trained dictionaries are then used to perform source separation of an input of sound data using nonnegative matrix factorization (NMF) in which relevant portions of the training dictionaries are chosen through comparison with hashes of the input.

In one or more implementations, a system includes one or more modules implemented at least partially in hardware. The one or more modules are configured to perform operations that include dynamically choosing relevant ones of a plurality of entries of an input matrix from hash codes pre-learned from each of the plurality of entries of an input matrix as a part of nonnegative matrix factorization (NMF) involving sound data. The hash codes of bases of the input matrix are updated at one or more iterations of part of the nonnegative matrix factorization (NMF) to refine subsequent choosing of relevant ones of the plurality of entries.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Compact representation of sound or other data may be utilized to improve efficiency of a pattern matching process, such as to match patterns of sound in an audio application. One such example is audio source separation. For example, a given time frame of a noisy speech signal may be converted into a frequency domain, and then represented as a weighted sum of pre-learned diction for speech and noise. However, although an increase in training dictionary spectrums may increase the accuracy of these techniques, the amount of the data may hinder a real-time system from performing the technique in real time. Accordingly, hash codes may be used to represent the dictionary and input noisy spectrums to enable selection of a subset of relevant spectrums from the dictionary at a time, which may permit use of this technique in real time scenarios.

Another example involves word spotting and audio retrieval. Word spotting is a technique in which audio signals are selected that include a specific keyword. However, searching a large audio archive with a conventional Hidden Markov Model (HMM) may be time consuming and resource intensive. Further, this may involve use of a peak picking procedure after calculating an inner product between template words and an excerpt of the archive signal, which is also resource intensive. Accordingly, hash codes of the signals may be used such that the filtering may be performed faster. This technique may also be used to extract audio content that is similar to a query signal. In this way, unseen signals may be audio tagged with increased efficiency. Further discussion of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

EXAMPLE ENVIRONMENT

Figure 1:
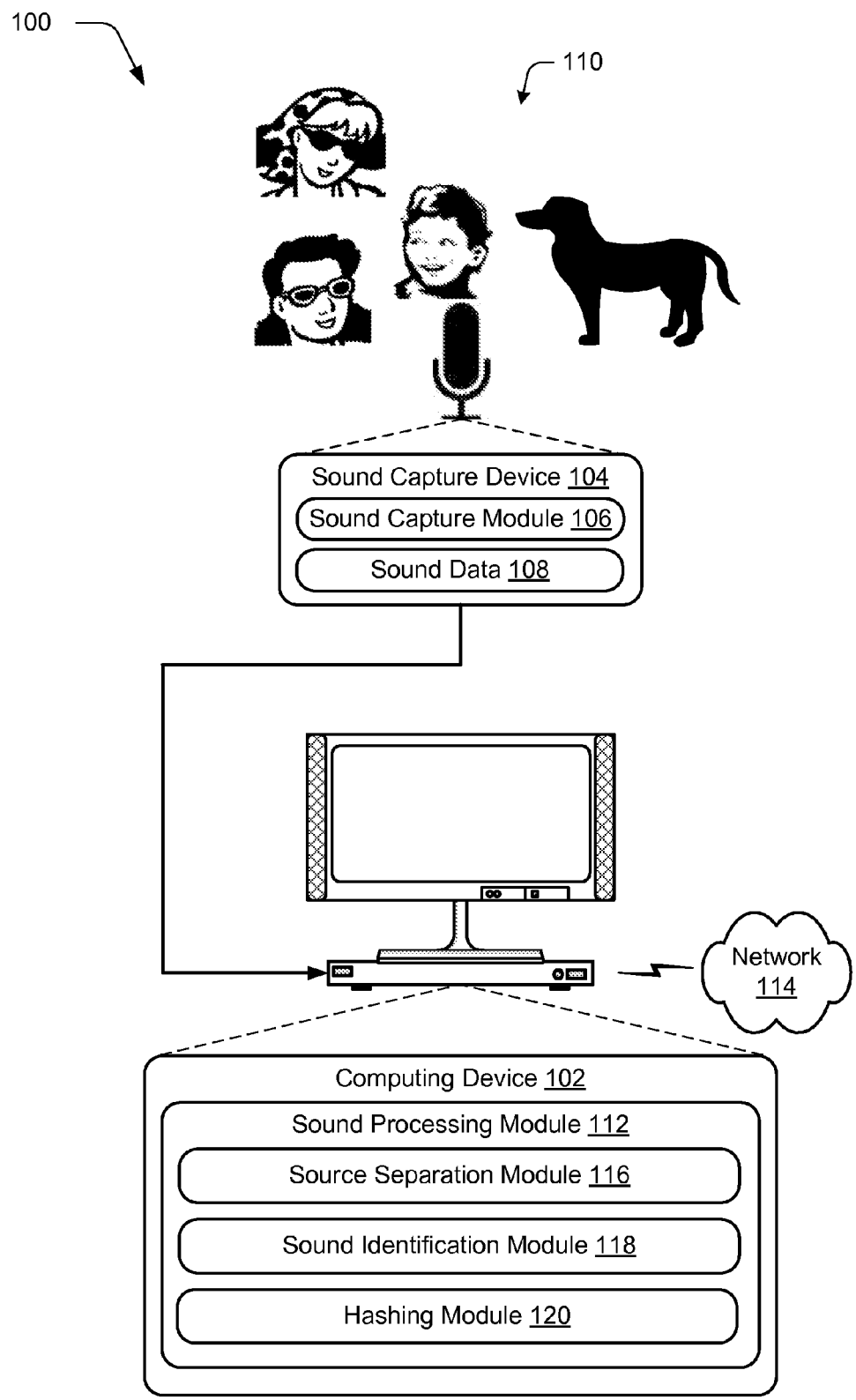
FIG. 1 is an illustration of an environment in an example implementation that is operable to employ pattern matching hash techniques for sound data as described herein.

FIG. 1 is an illustration of an environment 100 in an example implementation that is operable to employ pattern matching techniques described herein. The illustrated environment 100 includes a computing device 102 and sound capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 8.

The sound capture device 104 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture device 104 is illustrated separately from the computing device 102, the sound capture device 104 may be configured as part of the computing device 102, the sound capture device 104 may be representative of a plurality of sound capture devices, and so on.

The sound capture device 104 is illustrated as including respective sound capture module 106 that is representative of functionality to generate sound data 108. The sound capture device 104, for instance, may generate the sound data 108 as a recording of an audio scene 110 having one or more sources. This sound data 108 may then be obtained by the computing device 102 for processing.

The computing device 102 is illustrated as including a sound processing module 112. The sound processing module is representative of functionality to process the sound data 108. Although illustrated as part of the computing device 102, functionality represented by the sound processing module 112 may be further divided, such as to be performed "over the cloud" via a network 114 connection, further discussion of which may be found in relation to FIG. 8.

Examples of functionality of the sound processing module 112 are represented as a source separation module 116, a source identification module 118, and a hashing module 120. The source separation module 116 is representative of functionality to decompose the sound data 108 according to a likely source of the data. As illustrated in the audio scene 110 of FIG. 1, for instance, the source separation module 116 may be utilized to separate the sound data 108 according to different sources, such as to separate dialog from the people in the audio scene 110 from the barking of a dog. This may be used to support a variety of different functionality, such as audio denoising, music transcription, music remixing, audio-based forensics, and so on.

Another example of functionality of the sound processing module 112 is illustrated as a sound identification module 118. The sound identification module 118 is representative of functionality to spot particular sounds in the sound data 108, such as particular dialog, keywords, noises, and so on. This may be performed to support word spotting and audio retrieval, such as to select audio signals that contain a specific keyword.

As previously described, conventional techniques that were utilized to support functionality of the sound processing module 112, such as source separation and sound identification, could be resource intensive and therefore limit the usefulness of this functionality. Accordingly, a hashing module 120 may be employed by the sound processing module 112 to support fast pattern matching. As previously described, pattern matching may be utilized to support a variety of different functionality as described above and as such, pattern matching techniques that may increase efficiency and speed of the operation may also provide improvements for this functionality.

For example, a hashing technique may be used in place of some time consuming nearest neighbor search procedures during Nonnegative Matrix Factorization (NMF) and audio pattern matching. A hashing version of NMF, for instance, may be employed that is configured to dynamically choose relevant entries of input matrices and use these entries for an update. This may be utilized to support a variety of different functionality, such as audio source separation as performed by the source separation module 116 as previously described. Further discussion of operation of the hashing module 120 in combination with the source separation module 116, e.g., in support of NMF, may be found in a corresponding section below.

In another example, a hashing-based technique may be employed by the hashing module 120 as part of the sound identification module 118 to expand linear decomposition concept of NMF into deconvolution cases where the induced base templates are now basis images. This technique may be used to find an audio event in a large database that is similar to query signals, which may be utilized to support a wide variety of functionality including word spotting and audio retrieval. Other examples are also contemplated as further described below.

In the following discussion, NMF for audio source separation is first described, which is then followed by a discussion of audio retrieval and word spotting. A hashing technique is then introduced and then harmonized with these systems in the discussion that follows.

NMF for Audio Source Separation

Nonnegative matrix factorization (NMF) may first begin by constructing a library that is trained based on audio data, e.g., speech signals. For example, a clean set of speech signals may be obtained for training purposes by a source separation module 116, although other sets of speech signals may also be obtained based on the source separation goals.

A nonnegative matrix representation "$X^s$" may then be generated by applying Short-Time Fourier Transforms (STFT) to the signals, and taking a magnitude of resulting complex values. If characteristics of an unwanted sound (e.g., noise) that is to be removed is known in advance, the unwanted sound may also be represented with a matrix in the same way, in this instance matrix "$X^n$". Spectrum dictionaries "$W^s$" and "$W^n$" may then be pre-learned from the matrices as these matrices may reconstruct the training matrices as a weighted sum as follows:

$$X^s \approx W^s H^s$$

$$X^n \approx W^n H^n$$

In the above expressions, each column of "X" is a weighted sum of "W" with weights defined by the corresponding column of "H." The parameters may be learned using the following update rules:

$$W \leftarrow W \odot \frac{\{(R)^{(\beta-2)} \odot X\}H^T}{(R)^{(\beta-1)}H^T},$$

$$H \leftarrow H \odot \frac{W^T\{(R)^{(\beta-2)} \odot X\}}{W^T(R)^{(\beta-1)}H^T},$$

where "$\odot$" is for Hadamard products and exponentiations and divisions are carried in the element-wise manner as well. "R" stands for the current reconstruction "R=WH" using the parameters from the previous iteration. For each of the signal categories, speech and noise, the above updates are the same except a specific "X" is used per class. The parameter "$\beta$" defines the error function, e.g., a Euclidean distance between an input and a reconstruction when "$\beta=2$," KL-divergence when "$\beta=1$," and Itakura-Saito divergence when "$\beta=0$." Once the dictionaries are learned, the weights "H" and "H''" are discarded.

As for a mixture signal that may contain both speech and noise, the signal is first converted into a mixture matrix "$X^m$". Instead of learning basis vectors as above, however, this may be skipped but "$H^m$" may be updated as above. During this update, the following substitution may be made "W←{$W^s$, $W^n$}" so that a proposed "$H^m$" may be learned that represents the activations. To separate speech part "$\tilde{X}^s$" from "$X^m \approx \hat{X}^s + \hat{X}^n$", "$W^s$" may be multiplied by "$\tilde{H}^s$" where "$\tilde{H}^s$" is defined by:

$$H^m = [\tilde{H}^s; \tilde{H}^n].$$

where ";" is for stacking matrices along a vertical direction. Alternatively, software masking may be performed as follows:

$$\tilde{X}^s \approx X^m \odot \frac{W^s \tilde{H}^s}{W^s \tilde{H}^s + W^n \tilde{H}^n}$$

Speech part "$\tilde{X}^s$" is then converted based to the time domain using phase information of the input mixture signal.

At each step, the time complexity of the above update rules may be expressed as follows:

$$\mathcal{O}(MNK)$$

where "M," "N," and "K" are the number of rows and columns of "X" and the number of basis vectors in "W," respectively. Accordingly, the value "N" gets larger with lengthy training signals. When the dictionaries get substantially large, the value of "K" also grows.

Locally Sensitive Hashing

An alternative way to represent an input vector is to use a pairwise relationship. As there can be $$\text{``}\frac{n!}{2(n-2)!}\text{''}$$

pairs possible for a vector with "n" elements, this pairwise relation (i.e., which one is bigger among the pair) does not supply a compact representation, although it is comprehensive. For instance, the vectors that share the same pairwise relationship may be similar to each other even though actual values may differ.

Winner-Takes-All (WTA) hashing is an example of a technique that may be used to support a fast image search. As a member of a locality sensitive hashing family, its basic idea is to approximately encode each of the pairwise relationships of an input vector into a short length of hash code while preserving the property of the vector. WTA selects only "B" random elements from the vector at a time, and records the position of the biggest one in the random order as a hash code element. This maximum value can encode the information about at least "B" pairs of relationships where the maximum one is the bigger one of the two at each pair. If this random selection is repeated "C" times, for instance, the total length of the hash code is "C" and each element of the code may include "B" bits.

In one or more implementations, however, the techniques described herein may be configured such that given the "C" hash code elements, the hamming distance (e.g., number of positions at which the corresponding symbols are different) may be used as a distance measure which amounts to the number of matching elements. This matching is may be performed with improved efficiency over other methods, such as Euclidian distance, KL-divergence, and inner product, as these techniques are typically employed using a relatively short length (C) of vectors and the comparison is performed on bits using an "and" operation.

In the following discussion, this hash code representation may be employed instead of the full spectral vectors or spectrogram images when a larger number of comparisons are to be performed. Additionally, population respecting sampling (e.g., rejection sampling) may be used instead of random selection as further described below.

NMF with Hashing

This section includes a description of techniques that may be employed to harmonize hashing into the NMF framework described above. As previously described, NMF may be used in training dictionaries of specific sources and in separating a desired source from a mixture. A training scenario using NMF is first described, which is then follow by a description of usage in an audio separation context.

Figure 2:
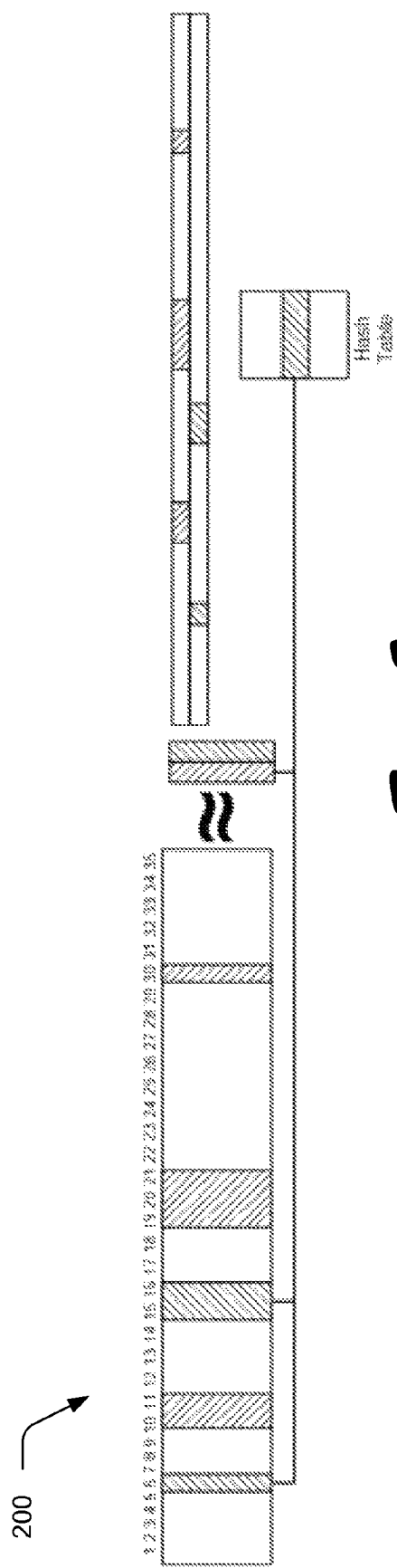
FIG. 2 depicts an example of a training case using pattern matching hash techniques.

The update rules described above may be expensive in terms of computing when it comes to large training signals (i.e., large "X") in the training scenario or large dictionaries (i.e., large "W") for the separation. FIG. 2 depicts an example 200 of a training case. Assume that two basis vectors, i.e., K=2, are being learned from a training signal "$X^s$." For each update of the basis "$W_{:,1}^{ms}$" (forward cross-hatching in FIG. 2) or "$W_{:,2}^{ms}$" (backward cross-hatching in FIG. 2), the relevant column vectors of "X" and element of "H" are chosen based on the hamming distance between them.

A hash code that is pre-learned before the NMF procedure may be used as an input matrix "X," with the hash codes of the bases being updated at each iteration. To make the comparison of the hash codes meaningful, a random selection order from the length "M" vector may be employed for each of the column vectors of "X" and the basis vectors of "W."

Since this comparison between the hash codes may be performed relatively cheaply, computationally, the set of relevant inputs may be refined at each iteration. After choosing those inputs per a basis, the update rules involve those selected ones, alone, as follows:

$$W \leftarrow W \odot \frac{XH^T}{WHH^T} \approx$$

$$W_{:,1} \odot \frac{X_{:,(10,11,19,20,21,30)}H^T_{1,(10,11,19,20,21,30)}}{R_{:,(10,11,19,20,21,30)}H^T_{1,(10,11,19,20,21,30)}} + W_{:,2} \odot \frac{X_{:,(6,15,16)}H^T_{2,(6,15,16)}}{R_{:,(6,15,16)}H^T_{2,(6,15,16)}},$$

for the case "β=2." This technique may also be extended to other choices of "β." Also, note that "R" may now be defined as:

$$R \leftarrow W_{:,1}H_{1,(10,11,19,20,21,30)} + W_{:,2}H^T_{2,(6,15,16)}$$

Thus, the value of "H" may be updated efficiently through update of relevant ones (i.e., relevant inputs) at this iteration. By doing so, "W" and "H" might be updated at the next iteration. This may involve use of new indices for the relevant ones instead of the previous ones, (10, 11, 19, 20, 21, 30) for the first basis and (6,15,16) for the second.

Figure 3:
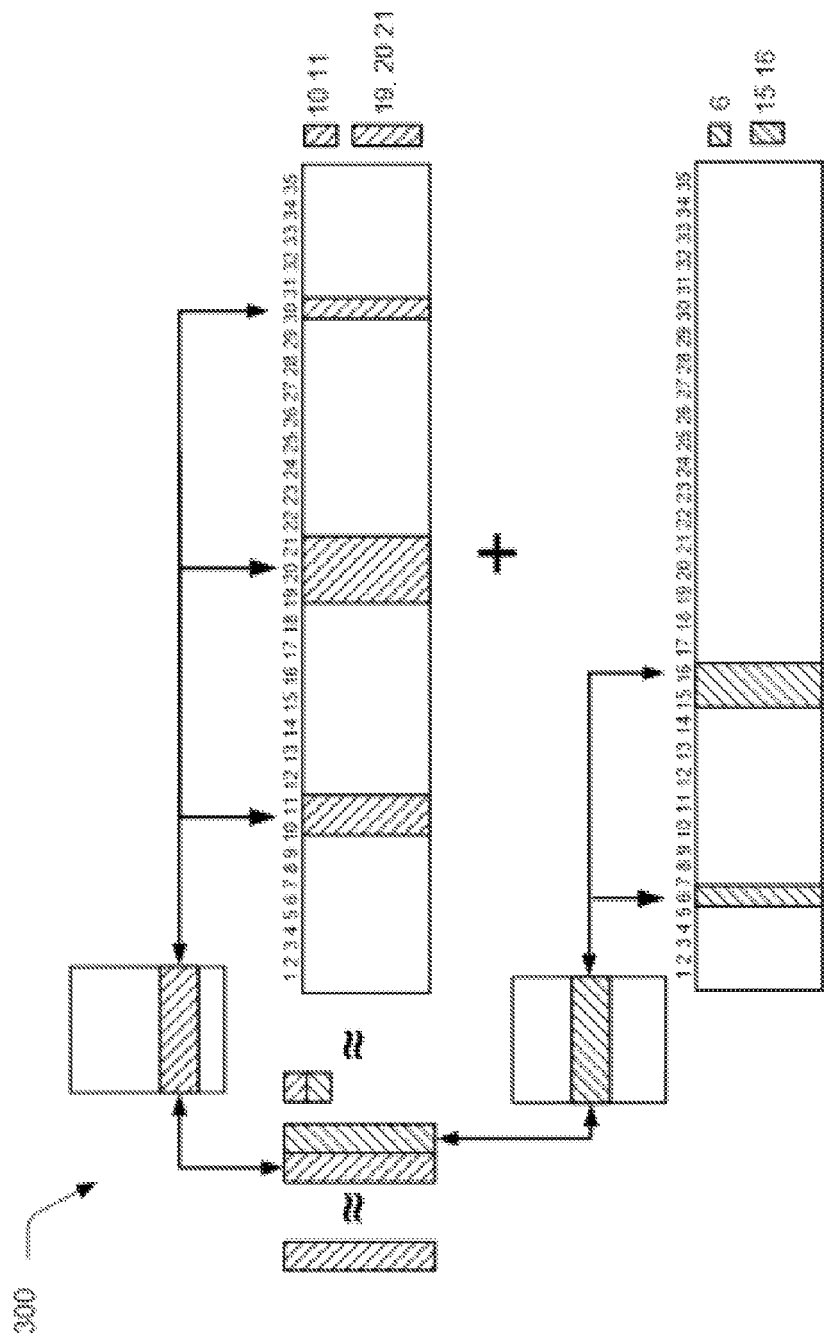
FIG. 3 depicts an example of diversity of source spectrums and choosing of relevant basis vectors.

In some instances, it may be desirable to utilize relatively large dictionaries "W" with large "K" to perform source separation. Although the large dictionaries "W" may provide diversity of source spectrums, it is not computationally efficient if just a portion of the basis vectors are relevant. FIG. 3 depicts an example of such an instance. For example, a given noisy input spectrum "xm" (a column vector of "$X^m$") may be decomposed into two sources:

$$x^m \approx \tilde{x}^s + \tilde{x}^n = W^s\tilde{h}^s + W^n\tilde{h}^n$$

for the pre-fixed dictionaries "$W^s$" and "$W^n$." For the current estimation of the source or noise, "$\tilde{x}^s$" or "$\tilde{x}^n$", at each iteration a comparison may be performed with the basis vectors as well so that the relevant ones are used. For instance, an update of "$h^n_{(6,15,16)}$-th" elements may be performed only for the second source (e.g., noise) as the hamming distance to "xn" may be considerably smaller than the other at the given iteration:

$$h_{(6,15,16)} \leftarrow h^n_{(6,15,16)} \odot \frac{W^{nT}_{:,(6,15,16)}x^n}{W^{nT}_{:,(6,15,16)}r}$$

where $$r = W^m_{hd\ :,(10,11,19,20,21,30)}h^n_{(10,11,19,20,21,30)} + W^m_{:,(6,15,16)}h^n_{(6,15,16)}$$

Figure 4:
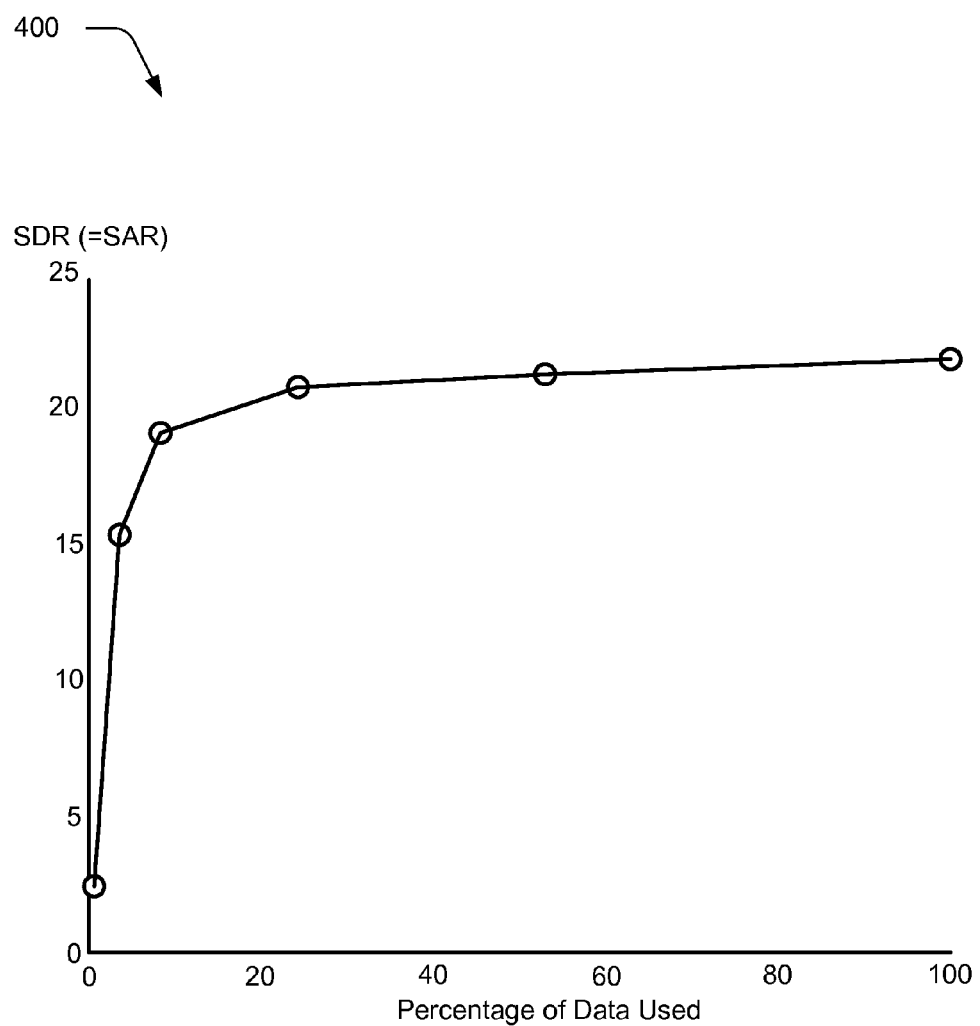
FIG. 4 depicts an example in graph form of performance of hashing nonnegative matrix factorization in a training phase.

FIG. 4 depicts an example in graph 400 form of performance of hashing NMF in a training phase. As shown in the graph, when a small amount of column vectors (e.g., ten to twenty percent) are used during learning, the training source signal may still be efficiently represented in comparison with a full NMF scenario, which is also reflected in the following table:

| Hash Codes Matching Rate | Percentage of Data Finally Used (%) | SDR (=SAR) |
| --- | --- | --- |
| 0.8 | 0.80 | 2.31 |
| 0.5 | 3.85 | 15.44 |
| 0.4 | 8.52 | 28.91 |
| 0.3 | 24.57 | 20.63 |
| 0.2 | 53.27 | 21.14 |
| NMF | 100.0 | 21.74 |

The acronyms "SDR" and SAR" stand for signal-to-distortion ratio and signal-to-artifact ratio, respectively, whose values can be infinity when the reconstruction is perfect. In practice, humans typically cannot detect an error when the number is above twenty.

Spectrogram Matching Using Hashing

The hashing techniques represented by the hashing module 120 of FIG. 1 may also be applied to support sound identification techniques represented by the sound identification module 118. For example, the above equation describing an inner produce of vectorized form of matrices may be rewritten as follows:

$$R(\tau) = \sum_{m=1}^{M} \sum_{n=1}^{N} Q_{m,n} V^\tau_{m,n}$$

$$= vec(Q)^T vec(V^\tau) \propto \sum \mathcal{H}(vec(Q)) \& \mathcal{H}(vec(V))$$

where "$\mathcal{H}$" represents a specific choice of hash function and "&" represents a bit-wise AND operation. In this example, WTA hashing is used for "$\mathcal{H}$" as described above.

As also previously described, sound identification techniques represented by the sound identification module 118 may be utilized to support a variety of different functionality. An example of this is an audio information retrieval system, such as to support navigation through menus based on natural language utterances of a user. This technique may be supported by spotting words in the utterances from sound data 108 captured by a sound capture device 104. This may be performed in a variety of ways, an example of which is described in the following.

First, each of the query and database signals are converted into the time frequency domain spectrogram, e.g., using a short time Fourier transforms (STFT) and the magnitudes of the complex values are taken.

Second, a frequency axis of the spectrogram is converted into a Mel frequency scale.

Third, each of the data points is then exponentiated to a number less than one so an area with relatively small energy may be properly considered.

Fourth, the mel-scale spectrogram is smoothed, e.g., using a moving average filtering.

Fifth, the smoothed mel-scale spectrogram is then transformed using a Discrete-Cosine-Transform (DCT) to obtain a Mel-Frequency Cepstrum Coefficient (MFCC).

Sixth, the MFCCs are then hashed. A predefined number of MFCC spectrums may be hashed at a time by sliding them from the start of the signals to the end. The size of the window, i.e., the number of the spectrums, may be the same.

Seventh, for the given query, a number of best matches are found through comparison with the possible labels of the database signals. In there is more than one query, this matching may be performed for each query.

Eighth, the most common label (e.g., class) is chosen for the query among the best matches.

A variety of different changes may be made to the above example. For example, steps 2, 3, 4, and 5 may be skipped. In another example, a number of "B" data points may be randomly chosen from the MFCC spectrums, with this choice being driven by an accurate representation of their population. For example, some areas of the spectrums may have higher energy than others, and therefore focus may be given to those areas. If amplitude (or magnitude if DCT is skipped) of the data is thought of as probabilities after normalization, an attempt may be made to sample from more probable positions that the less one. A variety of other examples are also contemplated without departing from the spirit and scope thereof.

Figure 5:
FIG. 5 depicts an example of a table showing hash code based pattern matching results on a keyword spotting example.

FIG. 5 depicts an example of a table 500 showing hash code based pattern matching results on a keyword spotting example. Given 128 test signals that contain the keyword greasy in this example, the goal is to point out the start and end time of the keyword in the given test signals. The accuracy is calculated based on the estimation of the presence. If the frame belongs to the keyword utterance, it is to be estimated like that as well. If the estimated keyword period is too wide, precision will drop. If it is narrow, recall will drop. As shown in the example table 500, values of "B=2" or "B=4" are sufficient to support desirable results. Further examples of hashing techniques that may be used to support source separation and sound identification may be found in relation to the following procedures.

EXAMPLE PROCEDURES

The following discussion describes pattern matching and audio separation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
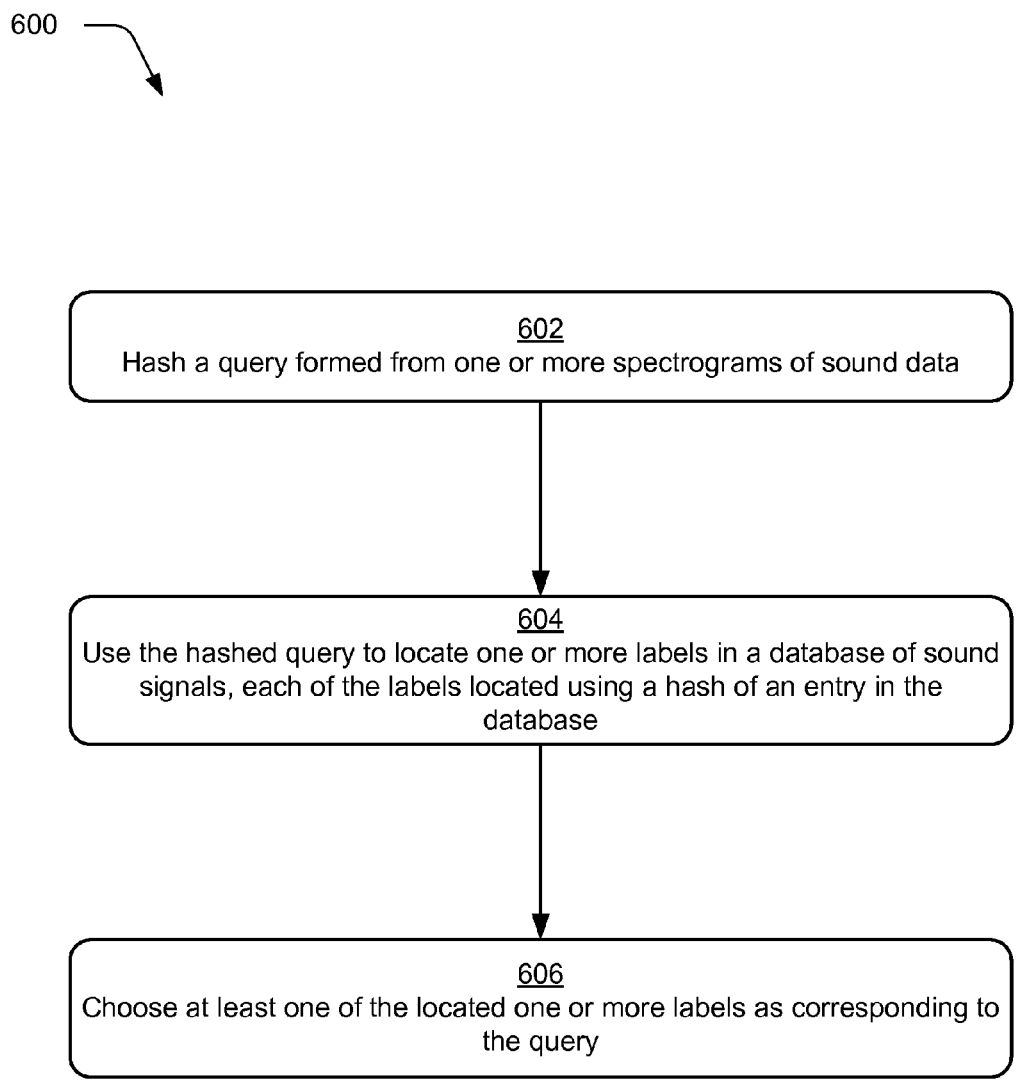
FIG. 6 is a flow diagram depicting a procedure in an example implementation in which a hashing techniques is used to label a query as part of identification of the query in sound data.

FIG. 6 depicts a procedure 600 in an example implementation in which a hashing technique is used to label a query as part of identification of the query in sound data. A query formed from one or more spectrograms of sound data is hashed and used to locate one or more labels in a database of sound signals (block 602). The query, for instance, may be processed to learn "what is said" in the sound data, such as particular keywords and so on. Accordingly, the query may be taken from a spectrogram to determine which keywords, if any, are contained in the query. To perform this with improved efficiency over conventional techniques, the query is hashed and used to locate one or more labels in a database of sound signals as further described below.

Each of the labels is located using a hash of an entry in the database (block 604). Continuing with the previous example, the hash of the query may be compared with hashes of entries in the data, such as spectrograms of keywords that are learned to form a dictionary. In this way, labels that correspond to the hashes may be located, which may be configured in a variety of ways. For instance, the labels may correspond to keywords represented by the hashes or other data, e.g., a label of a likely intent of a user such as to "fix" label that corresponds to a spectrogram for a "broken" phone.

At least one of the located one or more labels is chosen as corresponding to the query (block 606). The above process may continue to determine correspondence between hashes in a dictionary. Labels may then be collected and used to select which of the labels likely corresponds to the query, such as based on strength of match, number of similar labels, and so on. A variety of other examples are also contemplated to identify sound, e.g., by the sound identification module 118, using pattern matching as previously described.

Figure 7:
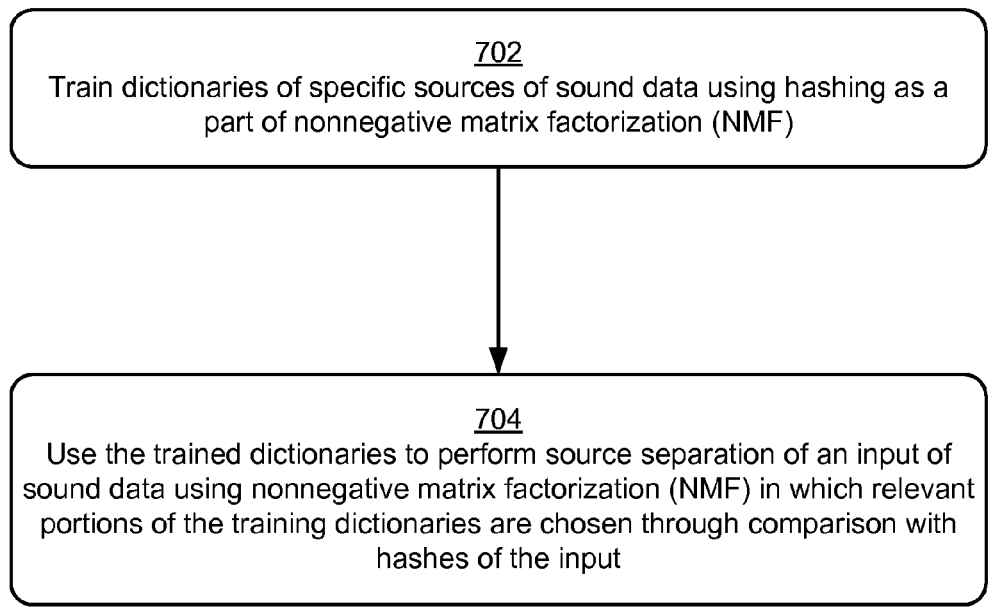
FIG. 7 is a flow diagram depicting a procedure in an example implementation in which hashing is utilized to train a dictionary as well as for comparison as a part of sound source separation.

FIG. 7 depicts a procedure 700 in an example implementation in which hashing is utilized to train a dictionary as well as for comparison as a part of sound source separation. Dictionaries of specific sources of sound data are trained using hashing as a part of nonnegative matrix factorization (NMF) (block 702). The dictionaries, for instance, may be trained using "clean" speech data to learn characteristics of clean speech signals to support source separation. The dictionaries may also be learned for "noisy" signals in instances in which a likely source of noise is known, e.g., a ringing of a cell phone, barking of a dog, wind noise, and so on.

The trained dictionaries are then used to perform source separation of an input of sound data using nonnegative matrix factorization (NMF) in which relevant portions of the training dictionaries are chosen through comparison with hashes of the input (block 704). Continuing with the previous example, the learning dictionary for a source may be utilized as a part of NMF to perform source separation. Additionally, if a learned dictionary is available for a noise source it may also be used. NMF may also be performed at this point by leveraging hashes, such as to choose relevant portions of the training dictionaries through comparison with hashes of the input. A variety of other pattern matching hash techniques for use with sound data are also contemplated without departing from the spirit and scope thereof.

EXAMPLE SYSTEM AND DEVICE

Figure 8:
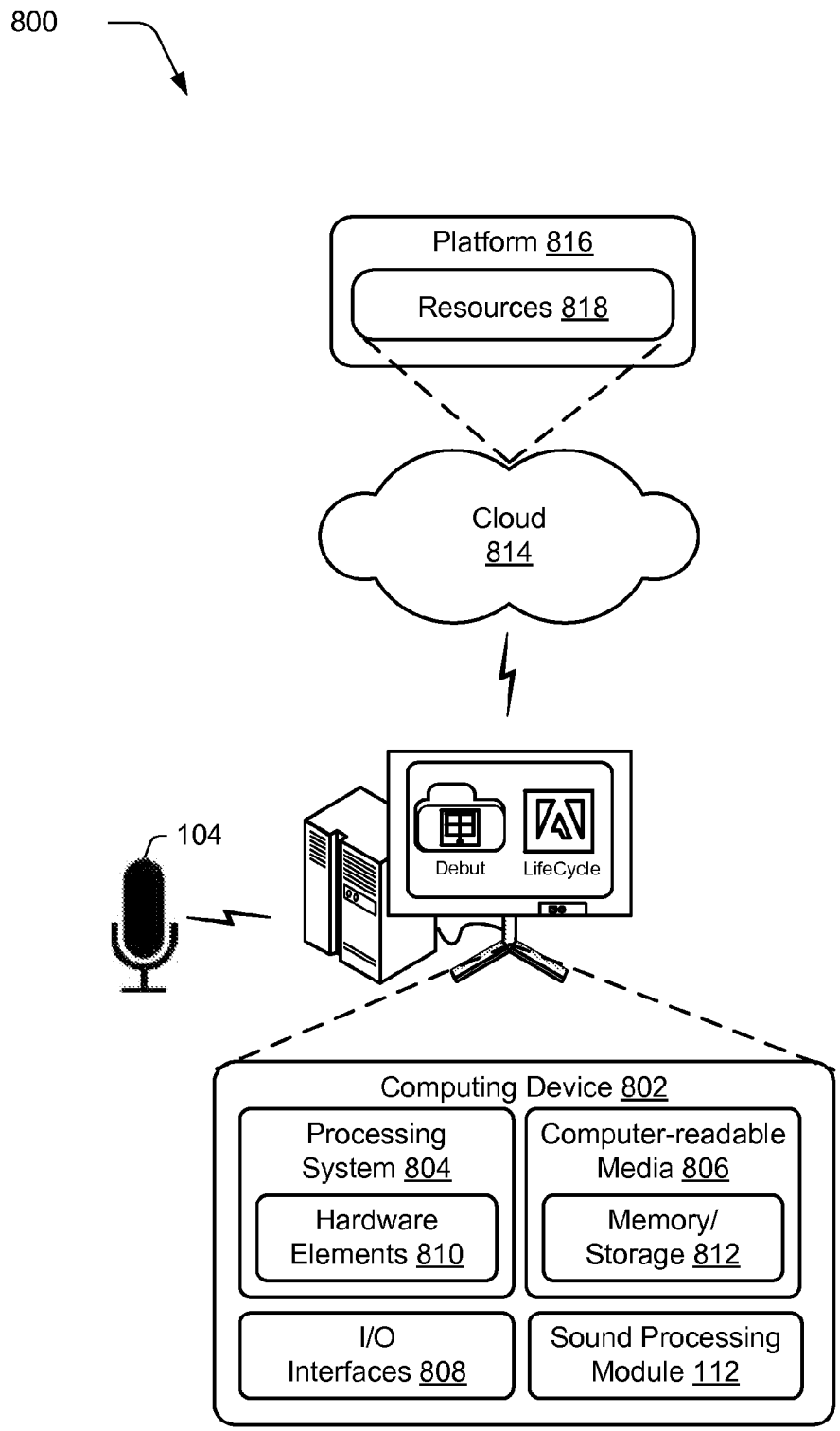
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the sound processing module 112, which may be configured to process sound data, such as sound data captured by an sound capture device 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-Wolfe-SBMC removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   hashing a query formed from one or more spectrograms of sound data;
   locating one or more labels in a database of sound signals using the hashed query as an input as a part of nonnegative matrix factorization, each of the labels located using a hash of an entry in the database; and
   choosing at least one of the located one or more labels as corresponding to the query.

2. A method as described in claim 1, further comprising forming the query using a sliding window to select a portion of a signal that is to be used to generate the query.

3. A method as described in claim 1, further comprising forming the query using a number of randomly chosen data points from the one or more spectrograms.

4. A method as described in claim 1, further comprising forming the query by:
   converting a signal into a time frequency domain as a spectrogram using a short term Fourier transform (STFT) and taking magnitude of complex values;
   converting a frequency axis of the spectrogram into a Mel frequency scale;
   exponentiating each data point of the converted spectrogram into a number less than one;
   smoothing the exponentiated spectrogram using moving average filtering; and
   transforming the smoothed spectrogram using Discrete-Cosine-Transform (DCT) to obtain Mel-Frequency Cepstrum Coefficient (MFCC) that serves as the query.

5. A method as described in claim 1, further comprising converting a signal into the one or more spectrograms of the sound data.

6. A method as described in claim 1, wherein the at least one label corresponds to an audio tag that is assigned to the query based on the choosing.

7. A method as described in claim 1, wherein the hashing is performed using winner-takes all (WTA) hashing.

8. A method as described in claim 1, wherein the hashing is performed to encode pairwise relationships of an input vector of the one or more spectrograms to form the hashed query.

9. A method as described in claim 8, wherein the hash of the entry in the database is also performed to encode pairwise relationships of an input vector of one or more spectrograms of the entry to form the hash.

10. A method comprising:
    training dictionaries of specific sources of sound data using hashing as input as a part of nonnegative matrix factorization (NMF); and
    using the trained dictionaries to perform source separation of an input of sound data using nonnegative matrix factorization (NMF) in which relevant portions of the training dictionaries are chosen based on a hamming distance through comparison with hashes of the input.

11. A method as described in claim 10, further comprising forming the input using a sliding window to select a portion of a signal or using a number of randomly chosen data points from one or more spectrograms formed from the signal.

12. A method as described in claim 10, wherein the source separation involves separation of noise from the sound data of the input.

13. A method as described in claim 10, wherein the hashing is performed as part of the nonnegative matrix factorization (NMF) to encode pairwise relationships of an input vector that corresponds to the specific sources of the sound data.

14. A method as described in claim 10, wherein the hashing is performed using winner-takes all (WTA) hashing.

15. A method as described in claim 10, further comprising using the training dictionaries to perform keyword spotting.

16. A system comprising:
    one or more modules implemented at least partially in hardware, the one or more modules configured to perform operations comprising:
    dynamically choosing, based on a hamming distance, relevant ones of a plurality of entries of an input matrix from hash codes pre-learned from each of the plurality of entries of an input matrix as a part of nonnegative matrix factorization (NMF) involving sound data; and
    updating the hash codes of bases of the input matrix at one or more iterations of part of the nonnegative matrix factorization (NMF) to refine subsequent choosing of relevant ones of the plurality of entries.

17. A system as described in claim 16, wherein winner-takes all (WTA) hashing is used to obtain the hash codes.

18. A system as described in claim 16, wherein updating the hash codes of bases of the input matrix further comprises employing a random selection order from the length vector for each of the column vectors and basis vectors.

19. A system as described in claim 16, wherein the nonnegative matrix factorization (NMF) is performed as a part of source separation of the sound data.

20. A system as described in claim 16, wherein the nonnegative matrix factorization (NMF) is performed as a part of source identification of the sound data.

* * * * *